INVENTORS
GUNTER REICHELT
WERNER LEIN

ATTORNEY

United States Patent Office 3,387,297
Patented June 4, 1968

3,387,297
SHEET POSITION SENSOR AND INDICATOR
IN A SHEET-HANDLING MACHINE
Günter Reichelt, Leipzig, and Werner Lein, Radebeul, Germany, assignors to VEB Druckmaschinewerke Leipzig, Leipzig, Germany
Filed May 17, 1965, Ser. No. 456,063
6 Claims. (Cl. 340—259)

ABSTRACT OF THE DISCLOSURE

An apparatus for indicating the position of a sheet having a thrust bolt carrying a magnetisable core surrounded by windings one of which is fed with an alternating voltage, whereby when a sheet moves the thrust bolt the change in magnitude of the voltage from the other winding is proportional to the movement of the magnetisable core.

---

The invention relates to a method indicating the position of a sheet in a sheet-handling machine; more particularly, but not solely in a printing machine.

It is known that hitherto the process of providing a means of examining the position of a sheet in a sheet-handling machine, which means possessing the main properties of rapidity and maximum accuracy, where only slight forces must act upon the sheet, and where easy adjustment of position and position tolerance limits must be available, is only incompletely provided by known methods.

Fundamentally, these methods are based upon the measurement of the position of a leading edge of a sheet, by an indicating means provided on the sheet-handling machine, which means operate at the moment when the moving sheet should reach the correct position on the sheet-handling machine. In order to reduce to a minimum the influence of the indicating means upon the sheet, contact-less indication must take place, or the forces involved must remain extremely small.

Methods of contactless indication are known which utilise a photo-electric or dielectric properties. For example, if the sheet is arranged as a dielectric between the electrodes of a capacitor, this capacitor can be arranged to determine a resonance circuit by the variation of capacitance caused by the sheet movement. This method of indicating sheet position is not accurate, since the accuracy is dependent upon the variable properties, for example, the moisture content of the sheets.

Photo-electric position indicating methods, for example, indication by means of a barrier of photo-cells or by reflection of a light ray from the sheet, respond only on unidirectional deviations, since such methods have only two functional positions; namely, photo-cell barrier open or closed, or reflection absent or present, respectively. The indication of sheet position is also not accurate, and any required adjustment of the sheet position can be made only by physical movement of the entire indicating means, and the position tolerance limit is equal to the error in the indicating means. A further disadvantage of photo-electric method of indication is that the electric lamp acting as a light source has a short life and must be replaced frequently. The sole advantage offered by the contactless indication methods is that the method of indication is inertia-less.

Moreover, sheet-position indicating methods are known in which mechanised contacts are actuated, either directly or indirectly by the sheet whose position is to be indicated. These contacts are arranged to operate sheet position indicators, or to operate known arrangements which will correct any sheet position error present. In actuation of the contact a relatively great force must be supplied by the sheet under investigation in order to overcome contact pressure, where the contact is opened by the sheet, or in order to apply an adequate contact pressure, where the contact is closed by the sheet. Since contacts are easily soiled and would corrode rapidly, they must be constantly maintained; also contacts have constantly changing contact resistances, which adversely influence the accuracy of sheet-position indication to such extent that the tolerance of the contact closure becomes greater than the minimum tolerance required in sheet-position indication.

Since in many cases it is not possible for the tested sheet to supply the amount of contact pressure necessary for the satisfactory function of the contact, indicating means are already used in which the contact pressure is produced by special auxiliary means which in turn are controlled by the tested sheet. The disadvantages caused by the electrical properties of the contacts are thus ameliorated, since the contact pressures can be kept constant and made as large as desired, but the cost of the sheet-position indicator is increased.

The auxiliary means, which are either mechanically or electro-magnetically driven with the drive being controlled by the movement of a feeder, possess an appreciable mass, and hence an appreciable mechanical inertia. The feeler, which is moved by the sheet under test, also possesses an appreciable mass, and must be accelerated by the sheet under test so that the feeler can control the auxiliary means.

The mechanical inertia of sheet-position indicating means which use mechanical contacts actuated by the sheet under test is the main limitation on the maximum speed.

A further major disadvantage of all sheet-position indicating means using mechanical contacts is that any change in position datum requires physical movement of the entire indicating means, and the tolerance limits of the sheet position are equal to the error of the indicating means.

An object of the invention is to provide a method of indicating the position of a sheet in a sheet-handling machine which not only possesses the advantage of inertia-less working prevously possessed by contact-less indicating methods, but also allows easy adjustment of the position tolerance limits independently of one another without mechanical displacement, of the indicating means, and furthermore operates with increased accuracy and with reduced contact forces, when compared with previous methods.

According to the invention we provide an apparatus for indicating the position of a sheet in a sheet-handling machine, which apparatus comprises a housing for attachment to the sheeet-handling machine, a table on said sheet-handling machine, an axially movable thrust bolt arranged within the housing and having one end extending out of said housing so as to lie adjacent to an edge of the table, a magnetisable core, which is secured to said thrust bolt, a primary winding and a secondary winding, said windings being arranged around said magnetisable core and secured to said housing; whereby when said primary winding is fed with an alternating voltage and when a sheet on said table moves into a position such as to move the thrust bolt and magnetisable core secured thereto, the change in magnitude of the alternating voltage fed out from the secondary winding is proportional to the movement of said magnetisable core.

Further according to the invention we provide a method for indicating the position of a sheet in a sheet-handling machine; whereby the positions of a sheet near the datum sheet position are proportionally converted by an inductive effect into alternating voltage amplitudes; these voltage amplitudes being compared with reference voltage levels, which correspond to the tolerance limits of the sheet position, and, when said sheet is stationary, any alternating voltage magnitudes which are outside said voltage reference levels cause the generation of defect pulses to indicate said out of limit position; further whereby said alternating voltage magnitudes change to a defined initial position when the sheet is completely removed from said datum sheet position.

A constructional embodiment of the invention will now be described, by way of example, with reference to the accompanying drawings, wherein.

Figure 1:
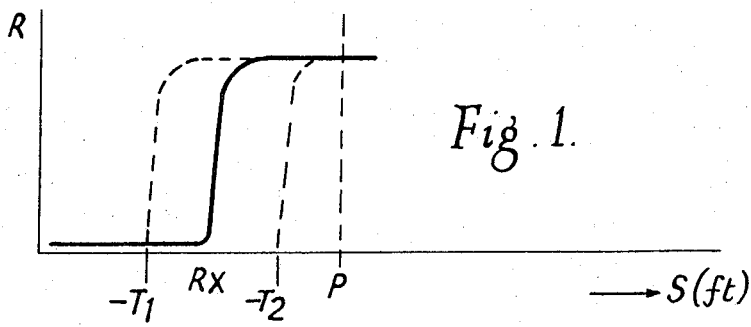
FIGURE 1 shows a diagram of the functional relationship between contact resistance R and contact or sheet movement S for a normally-on electrical contact.

FIGURE 1 shows the conditions occurring in an electrical contact, if used as indicating means, while a sheet is positioned within a sheet-handling machine. In FIGURE 1, when the sheet is displaced to point P the sheet has opened a normally-shut contact, so that the electric resistance of the contact is very high. The sheet is moved in the direction of the arrow, and, somewhere within an error region $Rx$ bounded by $-T_1$ and $-T_2$, the sheet opens the contact, whose low contact resistance changes into a very high contact resistance within a very short time; but the point at which this change in contact resistance occurs cannot be defined exactly, but lies within the error region $Rx$. The contact displacement will not open if the sheet displacement is less than $-T_1$ at the instant of sheet-position indication; also, the contact will always open if the sheet displacement is greater than displacement P at the instant of sheet-position indication. If the sheet displacement is very much greater than displacement P at the instant of sheet-position indication, the indicating means would only indicate that the contact was open and give no idea of the magnitude of the sheet displacement.

It is obvious that all sheet positions which are indicated to lay between displacements $-T_2$ and P cause the contact to open, but the contact may fail to open when sheets positions are indicated to lay between displacements $-T_1$ and $-T_2$, that is to say laying in the error region $Rx$, since the displacement $-T_2$ is the minimum displacement for reliable sheet-position indication, and displacement P is fixed by considerations of requirements of the sheet-handling machine, the region $-T_2$ and P, considered as the region of permissible position tolerance can be varied only by permanent displacement of the contact, that is to say permanent displacement of the point $-T_2$.

Naturally, it is possible to arrange two contacts in line with the direction of movement of the sheet, and at a distance apart which corresponds to the permissible position tolerance. The first contact being used for the opening of the sheet-position indicating circuit, with the second contact, which is actuated by sheets which are displaced too far, being used for the renewed closing of the sheet-position indicating circuit. With this arrangement the error region $Rx$ of both contacts appears as a factor impairing the accuracy of the arrangement. In order to vary the position tolerance region the contacts must be displaced in relation to one another; in order to vary the position of the centre of tolerance region the two contacts must be equally adjusted in relation to the displacement P.

Figure 2:
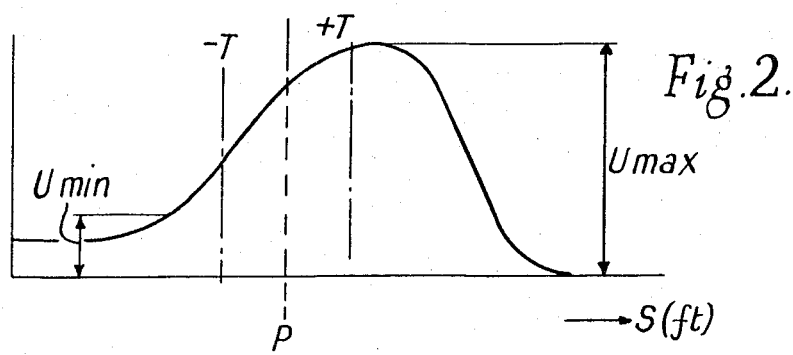
FIGURE 2 shows a diagram of the functional relationship between induced voltage U and core or sheet movement S of the indicating means used in the invention.

FIGURE 2 shows a corresponding diagram of functional relationship of the indicating method according to the invention. Here the magnitude of an alternating voltage output U is dependent upon the sheet displacement $s$. The sheet is positioned in the direction of the arrow, and it is required to occupy the datum sheet position characterised by P when the sheet is at rest and the sheet position is indicated. This datum sheet position corresponds to a definite position of a thrust bolt, which is connected to a movable magnetic core within a two winding transformer and thus to a specific output alternating voltage $Up$, which is fed to an evaluating arrangement. The evaluating arrangement, for example, an electronic amplifier with the two outputs connected to two thyratrons, can be so constructed that alternating voltage limits can be adjused by potentiometers or the like, so that a sheet position between these voltage limits is not indicated, but a sheet position lying outside these limits generates a defect pulse. Thus, between the minimum and maximum voltages $U_{min}$ and $U_{max}$, any two desired voltage values can be set as upper and lower sheet-position limits, for example $-T$ and $+T$ as shown, and these values can be varied as required without the physical movement of the entire indication device. For example, the tolerance limits can be set so as to take into account the working speed of the sheet-handling machine, or the speed at which sheet position errors can be corrected. The accuracy of the voltage measurements, from which the accuracy of the indication of sheet position is derived, can be made to a very high accuracy by suitable circuitry, so that changes in sheet position of a hundredth of a millimetre can be indicated—because an error region such as $Rx$ in FIGURE 1 does not occur. The accuracies of sheet-position indication is of the order of one tenth of a millimetre. The speed of indication can be increased, by increasing the frequency of the alternating current voltage, to be higher than any other known method.

Figure 3:
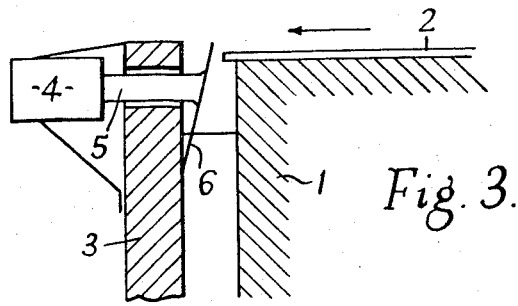
FIGURE 3 shows a partially-sectioned diagrammatic, lateral elevation of a sheet-position indicating means according to the invention, shortly before termination of the sheet movement.
Figure 4:
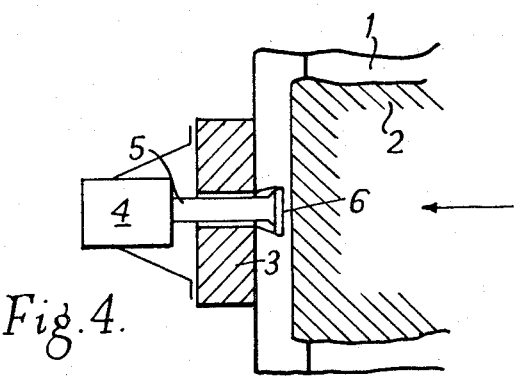
FIGURE 4 shows a partially-sectioned plan view of the indicating means shown in FIGURE 3.
Figure 5:
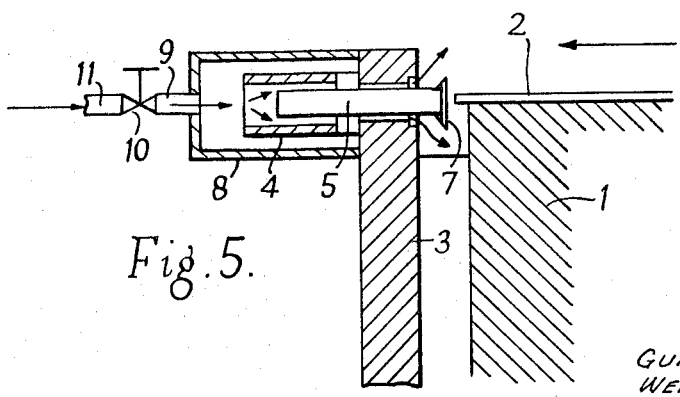
FIGURE 5 shows another example of embodiment of indicating means shown in same view as FIGURE 3.

A sheet-position indicating means using this indicating method is represented in the following FIGURES 3 to 6 in diagrammatic examples of embodiment. In FIGURES 3 to 5 a sheet 2 is moved in the direction of the arrow on a table 1. The sheet speed is constantly retarded so that the sheet 2 runs at decreasing speed with its leading edge directed towards a table stop 3. Behind the table stop 3 there is secured an inductive means for indicating sheet position 4, which has functional relationship as shown in FIGURE 2, and out of the housing of the indicating means 4 there projects a thrust bolt 5, which is connected to a magnetisable core of the indicating means 4, and which passes through the table stop 3 and is directed towards the leading edge of the sheet 2. In the example of embodiment according to FIGURES 3 and 4 the thrust bolt 5 is secured on a leaf spring 6, which is secured at its lower end on the table stop 3 and endeavours to draw the thrust bolt 5 out of the indicating means 4. The thrust bolt 5 is pressed into the indicating means 4 by the sheet 2, whose leading edge abuts against the leaf spring 6 and the sheet comes to a halt after the application of pressure by the leaf spring 6. As soon as the sheet 2 should have come to a halt in its precisely defined position, the indicating means 4 passes a voltage the magnitude of which depends upon the position of the thrust bolt 5 and thus upon the position of the forward edge of the sheet 2.

As already stated, it is especially advantageous to move the thrust bolt 5 pneumatically against the sheet 2. Such an arrangement is represented diagrammatically in FIGURE 5. The housing of the indicating means 4 is formed by means of a tightly fitting covering cap 8, in which there is situated a connection piece 9. A pressure-regulating valve 10 with a compressed air connection 11 is arranged directly on the connection piece 9, or is connected therewith through a flexible conduit. The compressed air introduced into the cover cap 8 can escape from the cover cap 8 only through a gap between the cylindrical hole in table stop 3, which is used as a guide for the thrust bolt 5 and the cylindrical thrust bolt 5 itself. The air escaping at the tip of the thrust bolt 5 strikes against the rear of a baffle plate 7. The pressure of the air against the end face of the thrust bolt 5 and the rear face of baffle plate 7 presses the thrust bolt 5 out of measured value, transmitter 4 to the required extent.

Since the mass of the thrust bolt 5 and the magnetisable core of the indicating means 4 amount to only fractions of a gramme, and the thrust bolt movement is only a few millimetres, the kinetic energy supplied by sheet 2 in order to move the core is extremely slight, as it is mainly needed to overcome the restoring force on the thrust bolt 5. A compressed air jet is particularly useful as a restoring force, and can be directed against the end of the thrust bolts remote from the baffle plate 7. The air pressure can be easily and accurately regulated without difficulty and, if the end face of the thrust bolt can be so formed that the thrust bolt floats upon a compressed air cushion, the minimum force is needed to move the thrust bolt. The use of compressed air as a restoring force causes a damping of the thrust bolt movement, and also provides self-cleaning of the indicating means by blowing out any foreign bodies which have entered the gap between the thrust bolt 5 and the table stop 3. Moreover it is possible, by variation of the air pressure, to vary the speed of the sheet.

Again in this example of embodiment the voltage delivered by the indicating means 4 is proportional to the position of the sheet's leading edge.

Figure 6:
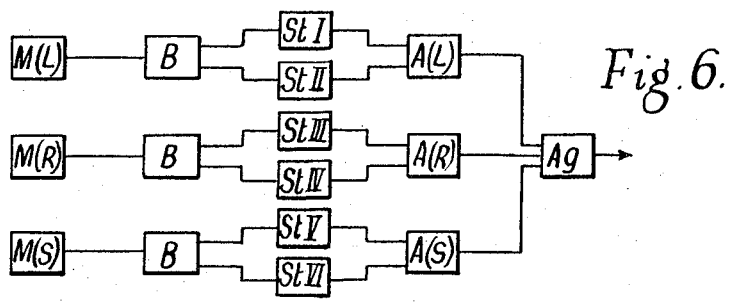
FIGURE 6 shows a block diagram of the circuit using three sheet-position indicating means for a complete indication of sheet position.

FIGURE 6 shows a block diagram of a circuit using three sheet-position indicating means for sheets fed into a sheet-handling machine, in which whether a sheet is positioned correctly in relation to sheet grippers or not, is indicated by the position of two front marks on the leading edge of the sheet and a side mark on the lateral edge of the sheet. At each of the three indicating points is an indicating means either M(L), M(R) or M(S), whose output voltage is fed to a limit-setting means B. In this limit setting means B the voltage values corresponding to the upper and lower tolerance limits +T and —T in FIGURE 2 are independently selected, by for example, variable resistors which control the setting voltage limits —T and +T as shown in FIGURE 2. This manner of adjusting the limit-setting means B makes possible both the selection of a tolerance region of desired width, and also any independent adjustment of a tolerance limit in relation to the voltage corresponding to displacement P, without the necessity of any physical movement of the indicating means M(L), M(R) or M(S) or the table stop 3.

The voltages from the indicating means are constantly applied to the limit-setting means B, which may also amplify these voltages, whose magnitudes are equal when the sheet edges are all in their correct positions, but switches $StI$ to $StVI$ are normally open-circuit; apart from the period of sheet-position indication, when the switches are short-circuit and the voltages are fed to a selector stage A(L), A(R) or A(S) and thence to Ag, an evalulating device. The selector stages A(L), A(R) or A(S) emit defect pulses which indicate by their magnitude whether the sheet-position is above limit +T or below limit —T. This can be arranged by means of two thyratrons which conduct at voltages above —T and above +T respectively, and each controls a different voltage level of the emitted defect pulse. If the magnitude of the input voltage corresponds to a sheet position between —T and +T the level of the emitted defect pulse is zero or some other suitable voltage level. At the evaluating device Ag the defect pulses from the selector-stages are evaluated in a known manner. In addition, the switch stages $St$ or the selector stages A(L), A(R) or A(S) can control indicator means so as to indicate the nature of the defects.

Figure 7:
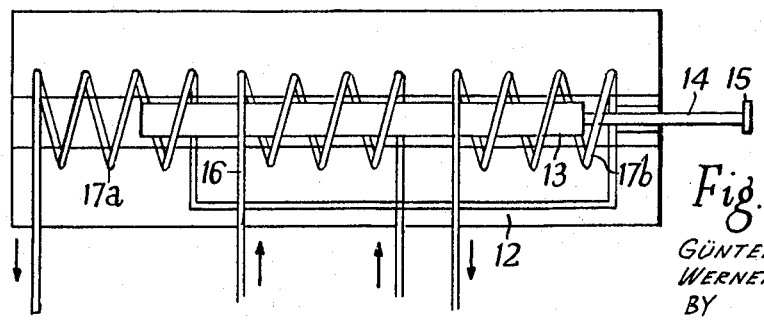
FIGURE 7 shows an enlarged, sectioned, diagrammatic representation of the mechanical and electrical assembly of an inductive indicating means used in the invention.

FIGURE 7 shows diagrammatically the assembly of an inductive indicating means. It consists of a housing 12, in which there is concentrically positioned a core 13, which is secured to a thrust bolt 14 which is secured to a baffle plate 15. A primary winding 16 and secondary winding 17a and 17b are concentrically arranged about the core 13 and within housing 12. The secondary windings 17a and 17b are connected together into two windings of opposite polarity of induced voltage; the left secondary winding being 17a and a right secondary winding being 17b, and are arranged on both sides of the primary winding 16 as shown in FIGURE 7. The core 13 can be easily displaceable axially so as to vary the mutual inductance between primary winding 16 and secondary windings 17a and 17b.

An alternating voltage is fed to the primary winding 16. When the core 13 is situated in the middle between the secondary winding halves 17a and 17b, as shown in FIGURE 7, the voltages induced in these secondary windings cancel each other. If the core 13 is shifted, for example, to the left, the voltage induced in the left secondary winding 17a increases; while the voltage induced in the right secondary winding 17b, being directed oppositely to left secondary winding 17a decreases. Thus a differential voltage appears across the secondary winding, the magnitude of this voltage being dependent upon the position of the core 13 with respect to the windings; thus, this differential voltage is directly related to the final position of a sheet which abuts the baffle plate 15 of the indicating means 4, as shown in FIGURE 7. The core 13 has a movement range of 0.5 to 1.0 mm.; whereas the normal differential transformer has a minimum core movement of 20 mm.

In the examples of embodiment described, as soon as sheet 2 is removed again from the baffle plate 15, by, for example, grippers, the core 13 must be returned again into its central initial position. This can be done for example, by means of a leaf spring 6, as shown in FIGURES 3 and 4, or by compressed air, as shown in FIGURE 5.

We claim:
1. An apparatus for indicating the position of a sheet in a sheet-handling machine, which apparatus comprises a housing for attachment to the sheet-handling machine, a table on said sheet-handling machine, an axially movable thrust bolt arranged within the housing and having one end extending out of said housing so as to lie adjacent to an edge of the table, a magnetisable core, which is secured to said thrust bolt, a primary winding and a secondary winding, said windings being arranged around said magnetisable core and secured to said housing; whereby when said primary winding is fed with an alternating voltage and when a sheet on said table moves into a position such as to move the thrust bolt and magnetisable core secured thereto, the change in magnitude of the alternating voltage fed out from the secondary winding is proportional to the movement of said magnetisable core.

2. An apparatus as claimed in claim 1, wherein the secondary winding is divided into two halves, the first half being on one side of the primary winding, the second half being on the other side of the primary winding, with all windings concentric with said magnetisable core, said secondary windings being so connected together that the voltages induced therein are oppositely directed.

3. Apparatus as claimed in claim 1 wherein said secondary winding is connected to a circuit comprising an amplifier, a plurality of adjustable voltage comparison means, a switch, a selector stage and an evaluating device, whereby said alternating voltage in the secondary winding is continuously amplified and compared with voltage limits set in the plurality of voltage comparison means, but is not switched to the selector stage or evaluating device until the sheet is at rest, whereupon, if the amplified secondary voltage lies outside said voltage limits, the selector stage emits defect pulses to the evaluating device, the defect pulses are evaluated in a known manner by the evaluating device.

4. An apparatus as claimed in claim 1, wherein a restoring means is provided to return said magnetisable core to an initial position, when said sheet is removed.

5. An apparatus as claimed in claim 4, wherein the restoring means is a spring attached between one end of the thrust bolt and a support of said housing.

6. An apparatus as claimed in claim 4, wherein the restoring means is compressed air axially directed against one end of the thrust bolt.

References Cited

UNITED STATES PATENTS

| | | | |
|---|---|---|---|
| 2,628,556 | 2/1953 | Fay | 101—248 |
| 2,770,768 | 11/1956 | Exner | 323—51 |
| 2,867,794 | 1/1959 | Dillon | 340—259 |
| 2,947,917 | 8/1960 | O'Brien | 317—149 |
| 2,991,997 | 7/1961 | Nilsson | 271—57 |
| 3,100,889 | 8/1963 | Cannon | 340—259 |

JOHN F. COUCH, *Primary Examiner.*

W. E. RAY, *Examiner.*